H. WYMAN.
PHOTOGRAPH FILM PACKAGE.
APPLICATION FILED DEC. 16, 1912.
1,101,230.
Patented June 23, 1914.
2 SHEETS—SHEET 1.
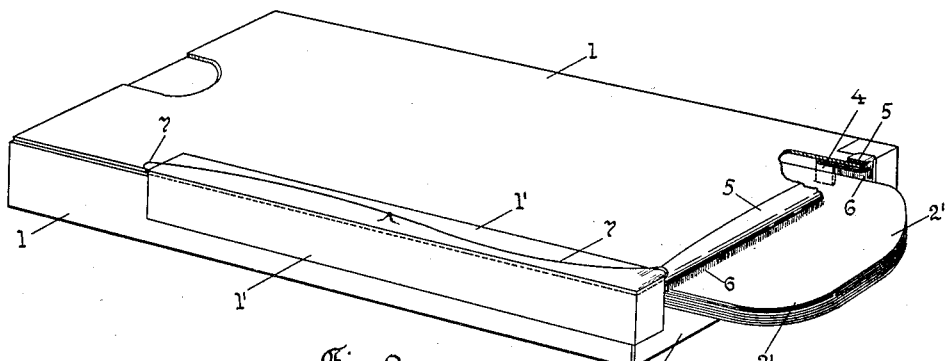
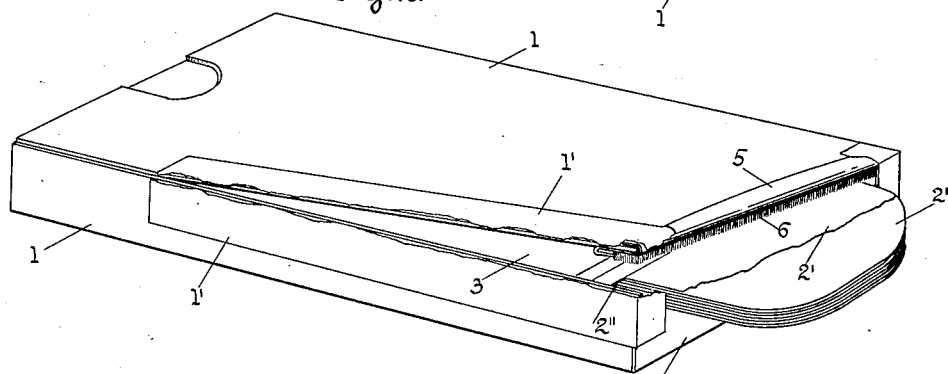
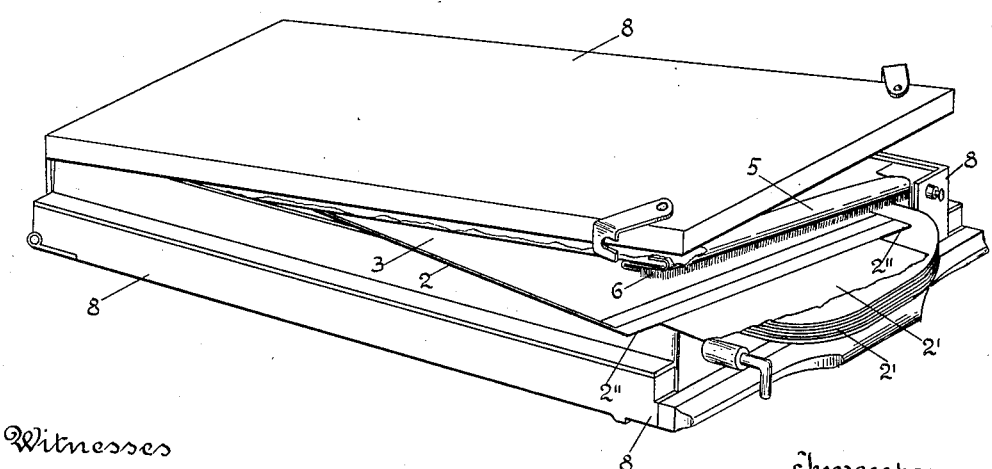
Witnesses
M. Bredt.
M. Haas.
Inventor
Horace Wyman.
By John C. Dewey
Attorney.

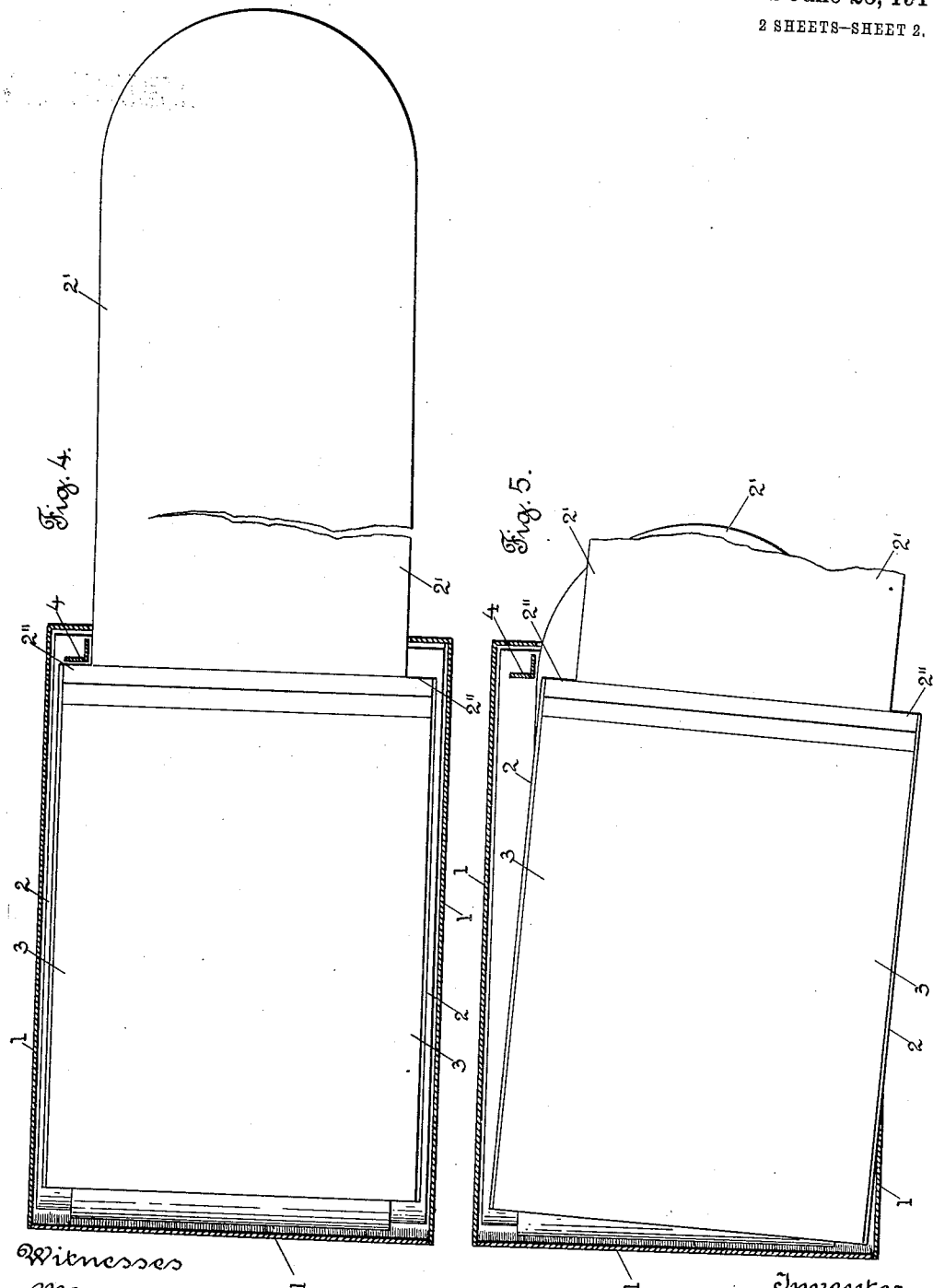

UNITED STATES PATENT OFFICE.

HORACE WYMAN, OF WORCESTER, MASSACHUSETTS.

PHOTOGRAPH-FILM PACKAGE.

1,101,230.

Specification of Letters Patent. Patented June 23, 1914.

Application filed December 16, 1912. Serial No. 736,923.

*To all whom it may concern:*

Be it known that I, HORACE WYMAN, a citizen of the United States, residing at Worcester, in the county of Worcester and State of Massachusetts, have invented certain new and useful Improvements in Photograph-Film Packages, of which the following is a specification.

My invention relates to a photograph film package of the type in which the package is carried in a camera, and the films separately exposed, and moved into a light excluding storage chamber in the package, and afterward the package removed for development.

Each film is provided with a paper backing, and a tab which extends through the storage chamber, and out through an opening in the front, and by means of which each film is drawn into the chamber after exposure.

The object of my invention is to improve upon the construction of film packages of the type referred to, and more particularly to provide means, whereby one or more of the exposed films may be withdrawn from the storage chamber, without removing the package from the camera in which the exposure was made, or from an adapter, if one is used, as will be hereinafter fully described.

Referring to the drawings:—Figure 1 is a perspective plan view of the bottom or lower side of a film package, of the type referred to, embodying my improvements. The back cover of the package is partially broken away at one side of the open end. Fig. 2 corresponds to Fig. 1, but shows the back cover edge of the package, on one side, at the open end, broken apart. Fig. 3 shows the film package shown in Fig. 2, inclosed in an adapter, said adapter being open at its front end, and a film and back sheet partially withdrawn therefrom. Fig. 4 is a central horizontal section through the package shown in Fig. 1, showing an exposed film withdrawn from the exposure chamber into the storage chamber, and the stop shoulder on the back sheet of the film engaging the stop abutment, on one side of the storage chamber at the open end thereof, and, Fig. 5 corresponds to Fig. 4, but shows the film partially removed through the side and open end of the package.

In the accompanying drawings, 1 is the film package, made of pasteboard, or other suitable material, and provided with an exposure chamber for the films, each film 3 having a paper back sheet 2, with a withdrawing tab 2'. Back of the exposure chamber is a dark storage chamber, having a back cover, and a partition between the two chambers, and the exposed films are drawn around the end of the partition into the storage chamber, by the back sheet 2 having its tabs 2' pass through the storage chamber and project out through an opening in the front end.

The tabs 2' are less in width than the films 3, and they leave a shoulder 2'' on the film, with its back sheet 2, at each side of the tab 2', one of which shoulders 2'', when the film is fully withdrawn into the chamber, contacts with and is arrested by an abutment 4 in the line of movement of a shoulder 2'' on a film and back sheet, and projecting up from the partition to near the back cover and near the stiffener bar 5, which bar supports the open edge of the back cover, and carries a light excluding material 6, between it and the projecting tabs 2'.

One of the edges of the back cover is severed from the side, at the corner opposite the abutment, for a distance along its side from the opening in which the tab 2' passes through, and the back cover and the side are united and sealed by a supplemental paper strip 1', as shown in Fig. 1, which strip may be easily torn, to allow the back cover to be separated from the side, as shown in Fig. 2, to allow the back cover to be raised, this separation may be made before the package is placed in the camera, if preferred.

By raising the hinged lid of the camera in which a film package is placed, or the lid of the adapter, if one is used, the front edge of the back cover can be raised to relieve the pressure upon the tabs, and the tab and its exposed film can then be detached from the abutment and removed from the package, all of which should be performed in the dark.

The film can be detached from the abutment by moving it sidewise from the abutment, with one edge passing into the open space between the back cover and side, when the seal is broken, and its opposite edge passing one side of the abutment as it is drawn out, or it can be detached by raising the shoulder of the film above the top of the abutment or abutments, if there is one at each side of the tabs, to pass over them, in the space between them and the back cover, when withdrawn, in which latter case the edge of the top cover on that side may also be opened for a short distance, if desired, to more readily allow it to be raised.

The stop abutment 4 or both abutments, if there is one at each side of the tab, may be attached to the partition, leaving a space between its top and the back cover, and placed back of the light excluding material on the stiffener bar 5, which material may be composed of fiber, or a brush, or of other elastic substance that will expand when a part of the tabs are removed, and continue to exclude the light.

When the package is in the camera, and the hinged lid is closed and locked by the usual catches common to all cameras, the lid will press upon the front edge of the back cover of the storage chamber, and keep its front edge in close contact upon the tabs, whether the back cover has or has not been severed from the side, and if exposed films have been removed with the camera in the dark and the lid of the camera closed before exposure to the light, the front edge of the back cover will then remain securely protected from the light passing into the chamber, by the downward pressure of the lid upon it.

If the exposure of all of the films and their removal into the storage chamber is made before any are removed from the chamber, then the seal of the back cover can remain unbroken, and the package can be removed from the camera and another package substituted in the daylight; if however the seal be broken for the removal of some exposed films, then the camera should be taken into the dark where it can be resealed, and afterward brought into the light for other exposures.

In connection with the paper sheet 1', I may use a thread 7, extending under said sheet, and by means of which the sheet may be torn, to separate the bottom and edge.

In Fig. 3, the film package is shown placed in an adapter 8; said adapter may be of any ordinary construction, and of the construction shown in Patent No. 728,719, dated May 19, 1903.

In using my improved film package, place the package in the camera, and before closing the lid draw out the separating thread 7, tearing across the binding strip of paper 11, or otherwise separating the back cover from the side, then close the lid, with its front edge pressing upon the edge of the back cover and the tabs under it, excluding the light from the storage chamber when the exposed films are drawn therein, the camera is then ready for exposures to be made. The lid of the camera must always be kept closed after exposed films are in the chamber, except when in the dark and films are to be removed.

In tearing off the projecting tab of an exposed film, drawn into the storage chamber, there should be enough of the tab 2' left projecting, (see Fig. 3), to be seized by the thumb and finger to withdraw the film from the chamber.

It will be understood that the details of construction of my improvements may be varied if desired.

The package may be made with side and bottom edges constructed in the usual manner, and subsequently severed by a knife or other means, before the withdrawal of the back sheet and exposed film.

The advantages of my improvements will be readily appreciated by those skilled in the art.

A single film, or any number of films, after exposure, may be withdrawn from the dark chamber of the film package for development, without removing the package from the usual adapter, or from the camera, if no adapter is used. This operation should be performed in the dark, with the package, in the adapter, or in the camera, inserted within a bag, or used in a dark room.

Having thus described my invention, what I claim as new and desire to secure by Letters Patent is:

1. In a photograph film package, having a dark storage chamber for exposed films, and open at the front end for the tabs of the film backing, and having one of the edges of the back cover, adjoining the open end severed from one side, and a binding strip over said severed edge, said binding strip adapted to be severed along said edge.

2. A photograph film package, having a dark storage chamber for exposed films, and an open end for the film backing tabs, and having one of the edges of the back cover, adjoining the open end, severed from one side, and a binding strip over said severed edge, said binding strip adapted to be severed along said edge, and means for severing said binding strip.

3. A photograph film package having a dark storage chamber for exposed films, said chamber having a stop abutment in the line of movement of a stop shoulder on the film back sheet drawn into said chamber, and means to sever said package through the wall of said chamber, on one side adjoining the open end, to permit passage therethrough.

4. A photograph film package having a dark storage chamber for exposed films provided with a stop abutment or abutments in fixed position, and projecting upward to arrest an exposed film when drawn therein, said storage chamber having a back cover detached from the abutments, and having one of its edges severed from the side, and said edge and side detachably secured together.

5. A photograph film package having an exposure chamber, and a dark storage chamber for exposed films open at the front, with a partition between the chambers, a back cover for the storage chamber having one of its edges severed from the side, the severance extending from the opening at the front, and said edge and side detachably secured together and abutments fixed on the partition, and extending upward to the back cover.

6. A photograph film package, having a dark storage chamber for exposed films, open at the front end for the tabs of film backings, a back cover for the chamber, having one of its edges severed from the side, the severance extending from the opening for the tabs, and said edge and side detachably secured together and abutments fixed in the storage chamber, and extending upward to the back cover, whereby the back cover can be raised from its side, and from the abutments.

7. A photograph film package, having an exposure chamber, and a storage chamber open at the front end, with a partition between the chambers, and stop abutments in the storage chamber on said partition, to arrest a film when drawn therein, and a back cover for the storage chamber having one of its edges severed from the side, and extending from the opening in the end along the side of the chamber and said edge and side detachably secured together.

HORACE WYMAN.

Witnesses:
 JOHN C. DEWEY,
 MINNA HAAS.

Copies of this patent may be obtained for five cents each, by addressing the "Commissioner of Patents, Washington, D. C."